United States Patent Office 2,782,380
Patented Feb. 19, 1957

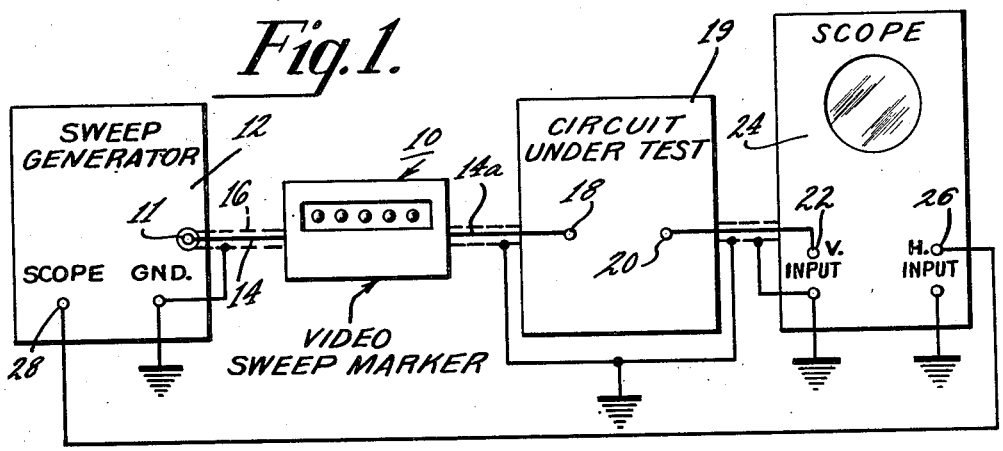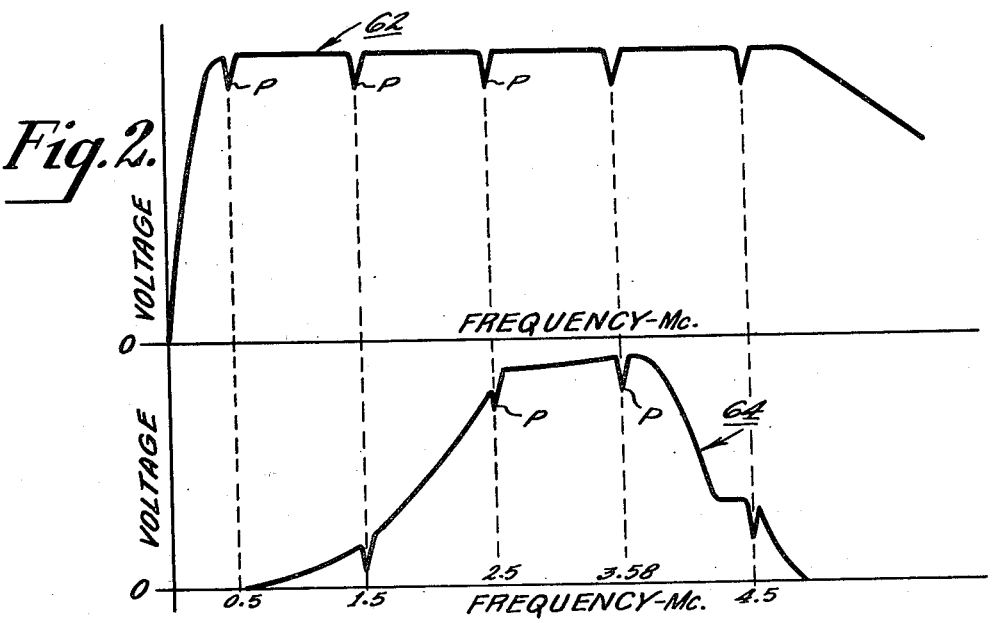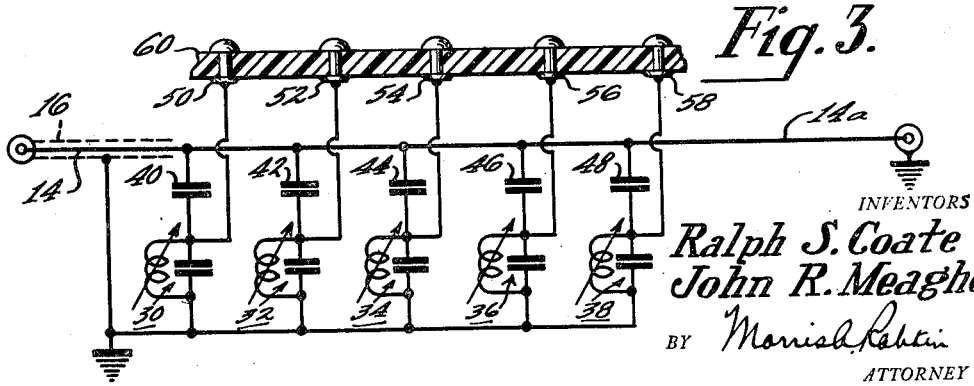

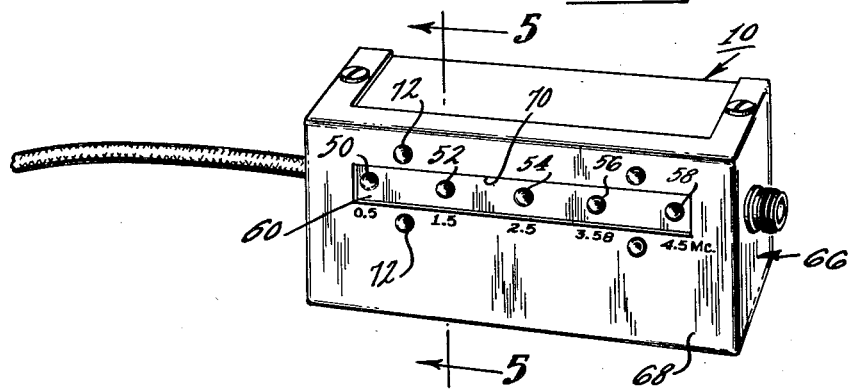
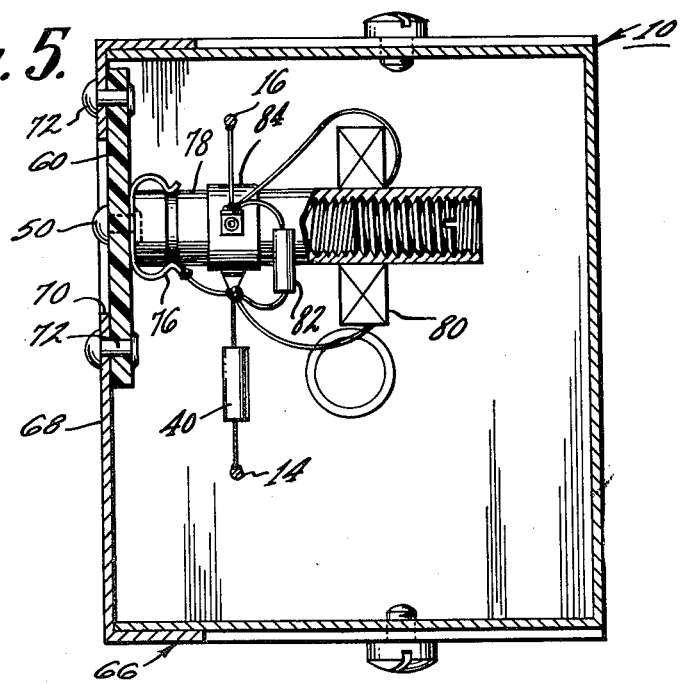

2,782,380

FREQUENCY MARKER

Ralph S. Coate, Haddonfield, and John R. Meagher, Gloucester City, N. J., assignors to Radio Corporation of America, a corporation of Delaware Application April 28, 1954, Serial No. 426,252

8 Claims. (Cl. 333—76)

This invention relates generally to frequency markers, and more particularly to apparatus for providing the frequency response curve of a circuit under test with a plurality of marker pips and with means for identifying the particular frequency of each of the marker pips. While neither specifically nor exclusively limited thereto, the frequency marker of the present invention is particularly applicable to identifying specific frequency points on frequency response curves of the band pass circuits employed in color television apparatus.

In checking and adjusting color television receivers, for example, the frequency response curves of particular circuits are viewed on an oscilloscope. In order to mark a frequency response curve with frequency pips, a frequency marker is connected in series between the output of a sweep generator and the input to the circuit under test. The output of the circuit under test is connected to an oscilloscope that is swept by a horizontal frequency that is provided by the sweep generator. In television circuits generally, and in color television circuits particularly, a plurality of critical frequency points must be at particular predetermined portions of the frequency response curves for proper operation of the apparatus. The frequency response curve of a video amplifier of a color television receiver, for example, may contain three or four critical frequencies that should be on predetermined portions of the curve in order to insure proper performance of the circuit. It has been proposed previously to insert frequency marker pips one at a time, thereby to provide a simplified means for identifying these markers. Where more than one frequency marker pip is inserted at one time, a relatively cumbersome switching arrangement must be provided for identifying each frequency marker pip.

Accordingly, it is a principal object of the present invention to provide an improved frequency marker adapted to provide a plurality of marker pips on a frequency response curve, and means to identify the particular frequency of each of the marker pips.

It is another object of the present invention to provide an improved frequency marker that will provide a frequency response curve with a plurality of marker pips and will provide a means of identifying these pips without the use of switches.

A further object of the present invention is to provide an improved frequency marker of the type described that is simple in construction and operation and yet is highly efficient in use.

In general, the foregoing and other objects and advantages of the present invention are accomplished by an improved frequency marker comprising a plurality of resonant circuits each tuned to a different successive frequency. A low voltage end of each of the resonant circuits is connected to a source of reference potential, and each of the other ends, that is, the high voltage end of each of the resonant circuits is connected to an input terminal through a separate capacitor. The high end of each resonant circuit is connected to a separate rivet, or finger contact means, on a sheet of insulating material. When the frequency marker is inserted in series between a sweep generator and a circuit under test, and the output of the circuit under test is placed on the face of an oscilloscope as a frequency response curve, the frequency response curve will be marked with a plurality of pips, each representing the frequency of a different resonant circuit of the frequency marker. In order to identify a particular frequency pip on the frequency response curve, it is merely necessary to touch the rivets successively on the insulated sheet, thereby causing the frequency pips to disappear one at a time. By touching a rivet, the resonant circuit associated therewith is effectively shorted to ground because the Q of the inductance of the resonant circuit is decreased. Thus, a frequency response curve of any circuit may be marked with a plurality of successive frequency pips, and each pip may be identified by touching the rivet connected to the high end of the resonant circuit of the frequency marker responsible for the pip.

The novel features of the invention, as well as the invention itself, both as to its organization and method of operation, will be understood in detail from the following description when considered in connection with the accompanying drawing in which similar elements have similar reference characters, and in which:

Figure 1 is a schematic diagram, in block form, of a circuit for producing a frequency response curve marked by a frequency marker in accordance with the present invention;

Figure 2 is a graph of frequency response curves used to explain the operation of the frequency marker;

Figure 3 is a schematic diagram of the circuitry of the frequency marker in accordance with the present invention;

Figure 4 is a front elevational view, in perspective, of the frequency marker of the present invention; and Figure 5 is a cross-sectional view of the frequency marker shown in Fig. 4, taken along the plane 5—5.

Referring now to Fig. 1, there is shown a frequency marker 10 having its input connected to the output terminal 11 of a sweep generator 12 through a lead 14. The lead 14 is the inner wire of a coaxial cable having an outer shield 16, shown in Fig. 1 by dotted lines. The shield 16 is connected to a source of reference potential, such as ground. The output of the frequency marker 10 is connected to an input terminal 18 of a circuit 19 under test, through a lead 14a. The output of the circuit 19 under test is taken from an output terminal 20 and applied to the vertical deflection circuit input terminal 22 of an oscilloscope 24. The horizontal sweep circuit terminal 26 of the oscilloscope 24 is connected to an output terminal 28 of the sweep generator 12 for the purpose of sweeping the oscilloscope 24 at the same repetition frequency applied to the frequency marker 10.

Referring now to Fig. 3, there is shown a schematic diagram of the circuitry of the frequency marker 10. The frequency marker 10 comprises a plurality of resonant circuits 30, 32, 34, 36 and 38, each comprising a variable inductor connected in parallel with a capacitor. Each of the resonant circuits 30 to 38 is tuned to a different successive frequency that will represent a separate frequency pip on the frequency response curves of circuits under test. The low end of each of the resonant circuits 30 to 38 is connected to the shielding 16, or source of reference potential, such as ground. The high end of each of the resonant circuits 30 to 38 is connected to the input lead 14 through a separate capacitor 40 to 48, respectively. The high end of each of the resonant circuits 30 to 38 is also connected to a separate terminal 50 to 58, respectively. The terminals 50 to 58 are located on one side of a sheet 60 of insulating material; and a separate lead from the high end of each of the resonant circuits 30 to 38 is connected to a separate one of the terminals 50 to 58, respectively, on the other side of the sheet 60. The terminals 50 to 58 are finger contact means and may be rivets. In practice, the rivets extend through the insulating material 60 with the heads thereof extending from one side of the insulating material 60 and the connections to the rivets extending from the other side of the insulating material 60.

It will now be understood that when the frequency marker 10 is connected in the circuit, as shown in Fig. 1, and when the circuit 19 under test is swept by the frequency generator 12, a frequency response curve of the circuit 19 under test will appear on the face of the oscilloscope 24. The resultant frequency response curve will be marked with a plurality of frequency marker pips, each representing an absorption of energy by the resonant circuits 30 to 38 of the frequency marker 10.

If the circuit 19 under test is merely a demodulator probe, the frequency response curve obtained on the oscilloscope 24 may appear as the curve 62 of Figure 2, for example, when the resonant circuits 30 to 38 are tuned to the frequencies .5 mc., 1.5 mc., 2.5 mc., 3.58 mc., and 4.5 mc., respectively. Frequency pips P, indicating these successive frequencies, will mark the curve 62, as shown. If the circuit 19 under test were a band pass circuit, such as the video amplifier of a color television receiver, the frequency response curve may appear as the curve 64 of Fig. 2.

It is noted that, with respect to the frequency response curves 62 and 64 in Fig. 2, the frequency .5 mc., represents the Q channel bandwidth in color television receivers; 1.5 mc. represents the I channel bandwidth; 2.5 mc. is the bandpass amplifier response, or the I channel bandwidth cutoff; 3.58 mc. represents the subcarrier frequency; and 4.5 mc. is the sound trap frequency for a video response curve. With each of the resonant circuits 30 to 38 of the frequency marker 10 tuned to a separate one of the aforementioned frequencies, respectively, an operator can identify each individual marker pip P on the frequency curve 64, for example, by touching the contacts 50 to 58 individually, and successively. For instance, by touching the contact 56, in Fig. 3, the resonant circuit 36 is effectively shorted and the marker pip P indicating the frequency 3.58 mc. will disappear from the curve 64. Thus, the marker pip indicates this particular frequency (3.58 mc.) when the respective rivet, or contact, associated with this frequency is touched by the operator's finger. The other marker pips may be individually identified by individually touching the respective rivets, or contacts, associated with their particular frequencies. By employing a frequency marker 10 adapted to mark a frequency response curve with a plurality of frequency pips P, each easily identifiable by touching a particular rivet contact, an operator may adjust, or align, a television receiver in a fraction of the time required by prior art apparatus.

Referring now to Figs. 4 and 5, there is shown the actual construction of the frequency marker 10 in accordance with the present invention, adapted to mark frequency response curves with a plurality of frequency pips P in the range from about zero to about 5 mc. It will be understood that these frequencies are merely given by way of example and are not intended in a limiting sense in either number or kind. The range of frequencies and the number of frequency marker pips possible are limited only by the practical frequency limitations of the equipment itself. The circuitry and components of the frequency marker 10 are contained in a metal container or casing 66. The casing 66 is a container of prismatic shape having a rectangular cross-section. The front wall 68 of the casing 66 is formed with an elongated opening 70 therein. The sheet of insulating material 60 is secured to the front wall 68 of the casing 66 by any suitable means, as by rivets 72. With this arrangement, it will be seen that the individual rivets 50 to 58 are in a position whereby they may be touched easily by the fingertip of the operator. The rivets 50 to 58 in addition to functioning as a fingertip touch contact, to short out the resonant circuit associated therewith, also functions to hold a spring clip 76 that holds an insulating hollow coil form 78 by friction. Counted concentrically on the coil form 78 is a coil 80 whose inductance (or reactance) may be varied by an adjustable core screwable in the coil form 78. A capacitor 82 is connected across the coil 80 and forms therewith the resonant circuit 30 of Fig. 3. The capacitor 40 is connected between the junction of the coil 80 with the capacitor 82 and lead 14. An insulating collar, such as a cardboard band 84, fixed to the coil form 78 serves as a terminal support. It will be noted that the high end, that is the junction between one end of the capacitor 40 and one end of the capacitor 82 is connected to the clip 76, which, in turn, is connected to the rivet 50.

Thus, there has been shown and described, in accordance with the objects of the present invention, a frequency marker circuit adapted to mark a frequency response curve of a circuit under test with a plurality of frequency markers, and means for easily identifying the particular frequency of each of the markers. To obtain a frequency response curve marked with a plurality of critical frequencies, the frequency marker is inserted between the output of a sweep generator and the input to the circuit to be tested. The output of the circuit to be tested is applied to the vertical deflection circuit of an oscilloscope and the horizontal circuit of the oscilloscope is swept at a frequency derived from the sweep generator. Each of the particular resonant circuits of the frequency marker, connected in parallel with each other, is tuned to a particular frequency to be displayed as a marker pip on the frequency response curve. Each of the frequency marker pips on the frequency response curves is identified individually by touching a separate contact connected to the high end of a separate one of each of the resonant circuits, respectively.

What is claimed is:

1. A frequency marker adapted to produce a plurality of successive frequency pips, each of a different frequency, on a frequency response curve of a circuit under test, said marker comprising a plurality of resonant circuits each tuned to a different frequency and each having a high end and a low end, means connecting each of said low ends together, a plurality of capacitors each having one end connected to a separate one of said high ends of said resonant circuits respectively, means connecting the other ends of said capacitors to each other, a plurality of electrically conductive finger contact means, and a separate connection from each of said high ends of said circuits to a separate one of said finger contact means respectively.

2. A frequency marker comprising a plurality of resonant circuits each adapted to be tuned to a different frequency and each having a high end and a low end, a plurality of capacitors each being connected in a series circuit with said high end of a separate one of said resonant circuits respectively, input and output means, said series circuits being connected between both said input and output means, and a plurality of electrically conductive finger contact means each connected to a separate one of said high ends respectively.

3. A frequency marker adapted to produce a plurality of successive frequency pips, each of a different frequency, on a frequency response curve of a circuit under test, said marker comprising a plurality of resonant circuits each tuned to a different frequency and each having a high end and a low end, means connecting each of said low ends together, a plurality of capacitors each having one end connected to a separate one of said high ends of said resonant circuits respectively, means connecting the other ends of said capacitors to each other, a plurality of electrically conductive finger contact means, a separate connection from each of said high ends of said resonant circuits to a separate one of said finger contact means respectively, a sheet of insulating material, said finger contact means comprising a plurality of rivets fixed in spaced relationship on said sheet and each having a head extending from one side of said sheet, and said separate connections to said finger contact means extending from the other side of said sheet.

4. A frequency marker adapted to produce a plurality of successive frequency pips, each of a different frequency, on a frequency response curve of a circuit under test, said marker comprising a plurality of resonant circuits each tuned to a different frequency and each having a high end and a low end, means connecting each of said low ends together, a plurality of capacitors each having one end connected to a separate one of said high ends of said resonant circuits respectively, means connecting the other ends of said capacitors to each other, a plurality of electrically conductive finger contact means, and a separate connection from each of said high ends of said resonant circuits to a separate one of said finger contact means respectively, a sheet of insulating material, said finger contact means comprising a plurality of rivets fixed in spaced relationship on said sheet and each having a head extending from one side of said sheet, said separate connections to said finger contact means extending from the other side of said sheet, a casing surrounding said resonant circuits and capacitors, said casing being formed with an opening therein, said sheet being fixed to said casing and covering said opening, and said heads of said rivets extending outwardly from said casing.

5. A frequency marker comprising a plurality of resonant circuits each adapted to be tuned to a different frequency and each having a high end and a low end, a plurality of capacitors each being connected in a series circuit with said high end of a separate one of said resonant circuits respectively, input and output means, said series circuits being connected between both said input and output means, a plurality of electrically conductive finger contact means each connected to a separate one of said high ends respectively, a sheet of insulating material, and said finger contact means comprising a plurality of rivets each extending through said sheet and having a head on one side thereof adapted to be touched by a human finger.

6. A frequency marker comprising a plurality of resonant circuits each adapted to be tuned to a different frequency and each having a high end and a low end, a plurality of capacitors each being connected in a series circuit with said high end of a separate one of said resonant circuits respectively, input and output means, said series circuits being connected between both said input and output means, a plurality of electrically conductive finger contact means each connected to a separate one of said high ends respectively, a sheet of insulating material, said finger contact means comprising a plurality of rivets fixed in spaced relationship in said sheet and each extending through said sheet and having a head on one side adapted to be touched by a human finger, a metallic casing surrounding said circuits, said casing being formed with an opening therein, said sheet being fixed to said casing and covering said opening, and said heads extending in a direction outwardly from said casing.

7. A frequency marker comprising a metallic casing formed with an opening therein, a sheet of insulating material fixed to said casing and covering said opening, a plurality of rivets extending through said sheet, each of said rivets having a head on one side of said sheet extending in a direction outwardly from said casing, and adapted to be touched by a human finger, and a portion of each of said rivets extending within said casing, a plurality of series circuits each comprising a capacitor and a resonant circuit within said casing, means to apply signals to said series circuits, and a separate connection from the junction of said capacitor and said resonant circuit of each of said series circuits to a separate one of said portions of said rivets respectively extending within said casing.

8. A frequency marker comprising a metallic casing formed with an opening therein, a sheet of insulating material fixed to said casing and covering said opening, at least two rivets extending through said sheet, each of said rivets having a head on one side of said sheet extending in a direction outwardly from said casing, and adapted to be touched by a human finger, and a portion of each of said rivets extending within said casing, at least two series circuits each comprising a capacitor and a resonant circuit within said casing, means to apply signals to said series circuits, a separate connection from the junction of said capacitor and said resonant circuit of each of said series circuits to a separate one of said portions of said rivets respectively extending within said casing, means for supporting each of said series circuits, and means for fixing said supporting means to said portions of said rivets within said casing for supporting said supporting means and said series circuits out of contact with said casing.

References Cited in the file of this patent

UNITED STATES PATENTS

| 2,186,825 | Dome | Jan. 9, 1940 |
| 2,677,804 | Foster | May 4, 1954 |

OTHER REFERENCES

"Receiver Bandwidth and Its Measurement," article in Audio Engineering of January 1951, pages 18, 19, 46 and 47.